United States Patent
Kawaguchi et al.

(10) Patent No.: US 7,036,779 B2
(45) Date of Patent: May 2, 2006

(54) LOCKING STRUCTURE FOR A CLAMP

(75) Inventors: Kiyofumi Kawaguchi, Yokkaichi (JP); Tomoyoshi Katayama, Toyota (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/896,893

(22) Filed: Jul. 23, 2004

(65) Prior Publication Data

US 2005/0082449 A1    Apr. 21, 2005

(30) Foreign Application Priority Data

Jul. 24, 2003   (JP)   ............... 2003-201164

(51) Int. Cl.
*F16B 15/00*   (2006.01)
*H01B 7/00*    (2006.01)

(52) U.S. Cl. .................. 248/220.31; 248/71; 24/297; 174/135

(58) Field of Classification Search ......... 248/220.31, 248/73, 71, 546, 224.8; 174/164, 166 R; 411/508
See application file for complete search history.

(56) References Cited

U.S. PATENT DOCUMENTS

| | | | | |
|---|---|---|---|---|
| 3,210,032 A | * | 10/1965 | Van Slyke | 248/73 |
| 3,412,368 A | * | 11/1968 | Asbridge et al. | 439/564 |
| 3,909,883 A | * | 10/1975 | Fegen | 174/138 D |
| 4,739,543 A | * | 4/1988 | Harris, Jr. | 24/297 |
| 4,811,922 A | * | 3/1989 | Yoneyama | 248/73 |
| 4,865,505 A | * | 9/1989 | Okada | 411/512 |
| 4,875,647 A | * | 10/1989 | Takagi et al. | 248/74.3 |
| 4,917,340 A | * | 4/1990 | Juemann et al. | 248/74.2 |
| 6,371,419 B1 | * | 4/2002 | Ohnuki | 248/74.2 |
| 6,749,157 B1 | * | 6/2004 | Takeuchi | 248/71 |
| 6,809,257 B1 | * | 10/2004 | Shibuya | 174/49 |

FOREIGN PATENT DOCUMENTS

| | | | |
|---|---|---|---|
| JP | 6-87101 | | 3/1994 |
| JP | 3250359 | | 8/1995 |
| JP | 08-082389 | * | 3/1996 |
| JP | 09-112516 | * | 5/1997 |
| JP | 2000052893 | * | 2/2000 |
| JP | 2000115966 | * | 4/2000 |
| JP | 2000-166062 | | 6/2000 |
| JP | 2001112148 | * | 4/2001 |
| JP | 2001245427 | * | 9/2001 |
| JP | 2003130015 | * | 5/2003 |
| JP | 2004129445 | * | 4/2004 |

OTHER PUBLICATIONS

English Language Abstract of JP 3250359.
English Language Abstract of JP 2000-166062.
An English language translation of JP 6-87101.

* cited by examiner

*Primary Examiner*—Anita M. King
(74) *Attorney, Agent, or Firm*—Greenblum & Bernstein, P.L.C.

(57) ABSTRACT

In a locking structure for a clamp, the clamp is formed with a projecting component to be fixed to a counterpart member through a through hole of the counterpart member via locking wings. A base plate section is equipped with a coupling step section which can engage the through hole and contact the entire inner peripheral surface of the through hole Pa. The locking structure can prevent the clamp from rotating by making the through hole of the counterpart member in an elongated shape while making the base in an elliptical shape.

10 Claims, 6 Drawing Sheets

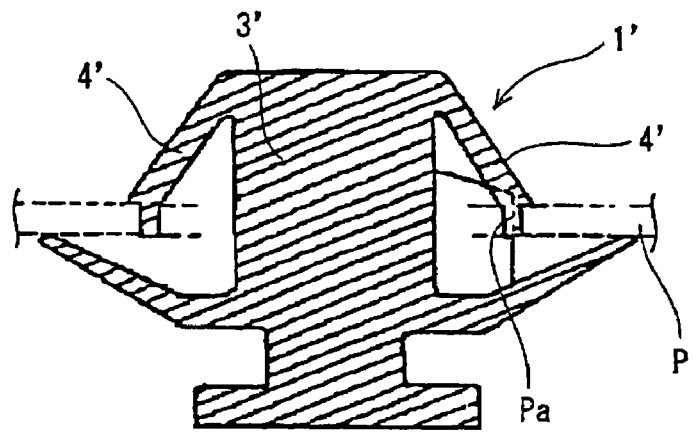
FIG. 6A
Prior Art
FIG. 6B
Prior Art
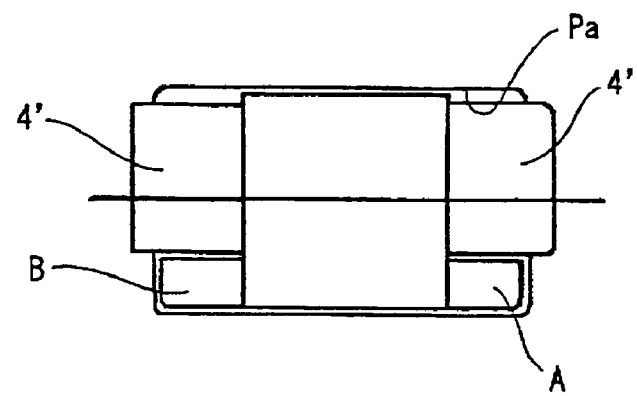
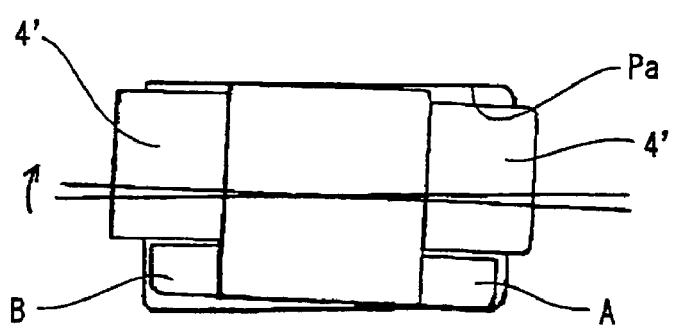
FIG. 6C
Prior Art
FIG. 6D
Prior Art
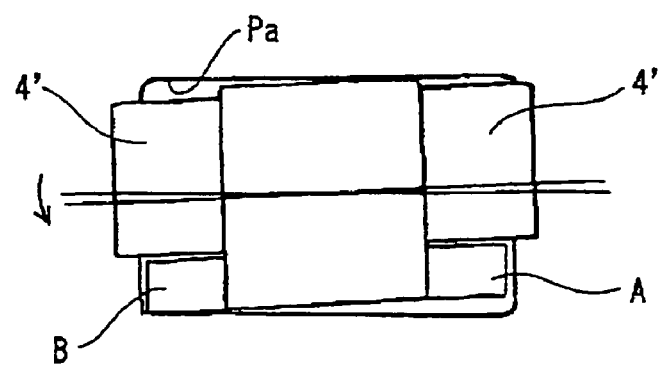

LOCKING STRUCTURE FOR A CLAMP

BACKGROUND OF THE INVENTION

1. Field of the Invention

The present invention relates to a locking structure for a clamp, and more particularly to a locking structure for a clamp which enables a component to be fixed to a counterpart member such as an automotive body panel to be securely locked and fixed through a through hole in the counterpart member.

2. Description of the Background Information

Conventionally, a clamp 1 is generally used as a member to fix elements to portions of an automotive body, as shown in FIGS. 5A and 5B. This clamp is equipped with a pair of locking wings 4 formed to extend rearwardly from the tip section of support pin 3 which projects from base plate section 2. The outer surface sections of the tips of locking wings 4 are equipped with locking stepped sections 4a to be locked through a through hole Pa formed on automotive body panel P.

To lock the clamp 1 to automotive body panel P, first, the tip of support pin 3 is inserted forcefully into through hole Pa of automotive body panel P. Then, inner periphery of through hole Pa pushes locking wings 4 partially closed against their elastic resistance. When support pin 3 is pushed deeper into through hole Pa until base plate section 2 comes in contact with a surface of automotive body panel P, locking wings 4 elastically recover to open, and then locking stepped sections 4a are locked against an opening peripheral section of through hole Pa.

In this manner, clamp 1 does not come out of through hole P and remains locked and fixed. As it is shown in FIG. 5B, however, the only sections of clamp 1 which come in contact with the inner peripheral surface of through hole P are locking stepped sections 4a and portion of support pin 3. Gaps appear between clamp 1 and through hole P. Therefore, these gaps allow foreign objects and water to flow in, and it is difficult to apply clamp 1 to locations where dust control or water proofing is necessary.

Moreover, even if through hole P is an elongated hole, there is an issue in that clamp 1 easily yields to a rotational force applied on clamp 1 and rotates. In other words, the elasticity of locking wings 4 allows locking stepped sections 4a to easily deform and locking wings 4 to close as clamp 1 rotates. Therefore, locking wings 4 can not prevent clamp 1 from rotating. When a rotational force is applied to clamp 1, there is a possibility that locking stepped sections 4a come loose. When clamp 1 rotates in this manner, a component to be fixed which is equipped with clamp 1 rotates as well. Thus, the component to be fixed does not remain at a fixed location and there is a concern in that it may interfere with other components and elements in the vicinity. Moreover, as an example, when clamp 1 is employed to temporarily fix a component, for determining a final position for the component, the component can be fixed by tightening bolts on other locations. However, there is the problem that the component may move if the clamp 1 rotates, making it difficult to fix the component.

Hence, there are clamps such as a clamp 1' disclosed in Japanese Patent Publication No. 3,250,359, depicted in FIGS. 6A–6D, in which projecting anti-rotational ribs A and B, which are separate from locking wings 4', are provided on a support pin 3' of clamp 1', so that anti-rotational ribs A and B come in contact with the inner periphery of through hole Pa, thereby preventing clamp 1' from inadvertently rotating (Patent Citation 1).

Even the clamp 1', however, has a construction in which portions of locking wings 4 come in contact with the inner peripheral surface of through hole Pa. Hence, when an excess rotational force is applied to clamp 1', locking wings 4' still deform against elastic resistance to close, thereby making it difficult to provide secure locking against rotation. Moreover, although the existence of anti-rotational ribs A and B enables clamp 1' to have a greater number of areas to come in contact with the inner peripheral surface of though hole Pa, locking wings 4' themselves have a structure in which they are locked on the inner peripheral surface of though hole Pa, and elastically open and close in an independent manner. Therefore, gaps can not be eliminated and it is difficult to provide for perfect protection against dust and water.

SUMMARY OF THE INVENTION

A purpose of the present invention is to resolve the above issues by employing a construction in which a clamp comes in contact with the entire periphery of an inner peripheral surface of a through hole through which the clamp is to lock and be fixed.

In the construction of the present invention, when the clamp is locked and fixed with the through hole of a counterpart member, the through hole engages with the base and the coupling stepped section can come in contact with the entire periphery of the inner peripheral surface of the through hole. Therefore, the base completely blocks the through hole, and thereby prevents dust and water from passing through the through hole. Moreover, a clamp having a base in the above construction is formed using a mold with segments which are put together along a direction which intersects with the axis of a support pin. With this design, the clamp can be molded without gaps being created at locations on a base plate facing the locking wings which would appear when a conventional clamp is molded using a mold which is separated across a plane including the axis of a support pin.

Additionally, it is preferred that a pair of guide portions which extend in directions intersecting the locking wings are integrally formed on the support pin and that sloped guide surfaces are formed from the tip of the support pin to the coupling stepped section on the outer surfaces of the guide pieces. With this design, when the clamp is inserted into a through hole, the sloped guide surfaces of the guide portions as well as the outer surfaces of the locking wings come in contact with and slide over an opening peripheral section of the through hole. Therefore, the clamp can be guided to the central position within the through hole and thereby, the locking step section can comfortably and smoothly couple the entire inner periphery of the through hole.

Further, if reinforcement ribs are formed between the guide portions and the base, the support pin can be made stronger and thereby, can be prevented from being damaged by an external force to the clamp.

The through hole may be of an elongated shape and the coupling stepped section of the base may be designed to match the entire periphery of the inner periphery surface of the elongated shape. With this design, the coupling stepped section of the base comes in contact with the entire periphery of the inner peripheral surface of the through hole and the through hole has an elongated shape, both of which work together to prevent the clamp from rotating with respect to the through hole. Therefore, a component which the clamp locks and fixes to a counterpart member is locked and fixed to the through hole while its rotational movements are also restricted. Therefore, the component to be fixed would not interfere with other components and can be precisely positioned at a desired position and maintained there.

Additionally, a component to be fixed is an electrical connection box and the counterpart member is an automotive body panel. The clamp may be formed integrally on an outer surface of the electrical connection box while the electrical connection box may be fixed on the automotive body panel through the clamp. According to the above construction, when the electrical connection box is fixed on the automotive body panel through the clamp, coupling between a coupling stepped section formed on a base of the clamp and a through hole with an elongated shape on the automotive body panel would not allow the electrical connection box to rotate and can fix it with a desired orientation. Therefore, when the electrical connection box is fixed by fastening bolts on other locations of the box, alignments will not be lost as bolts are inserted into bolt holes and the work operability to fix the box can be improved.

An aspect of the present invention includes locking structure for a clamp for insertion through a through hole of a counterpart member to lock and fix a component to the counterpart member, the locking structure comprising a support pin projecting from a base plate section of the clamp; a pair of locking wings extending from a tip section of the support pin so that a peripheral edge section of the through hole may be sandwiched between free ends of the locking wings and the base plate section; and a coupling step section projecting from a base of the base plate section to engage the through hole and contact the entire inner peripheral surface of the through hole. Further, the locking structure may include a pair of guide pieces provided on the support pin and extending in directions substantially transverse to the locking wings; and sloped guide surfaces extending from the tip section of the support pin to the coupling step section on the outer surfaces of the guide pieces.

In a further aspect of the present invention, reinforcement ribs are formed between the guide pieces and the base. Further, the coupling step section has an elongated shape which matches the inner peripheral surface of the through hole. The component to be fixed is an electrical connection box, and the counterpart member is an automotive body panel, and the clamp is formed integrally on an outer surface of the electrical connection box such that the electrical connection box can be fixed on the automotive body panel through the clamp. In a further aspect of the present invention, the locking structure is formed integrally and in one piece with the component to be fixed to the counterpart member. Alternatively, the locking structure is attached to the component to be fixed to the counterpart member. The locking structure projects from the component to be fixed to the counterpart member. Each of the locking wings includes a tip section draping substantially vertically toward the base plate section. Further, the distance between the tip sections of the locking wings is greater than the distance across a side of the base. The base has an elongated shape which matches the inner peripheral surface of the through hole. Further, the locking structure may include joining sections provided at ends of the sloped guide surfaces.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which:

FIGS. 6A–6D illustrate a second conventional clamp.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
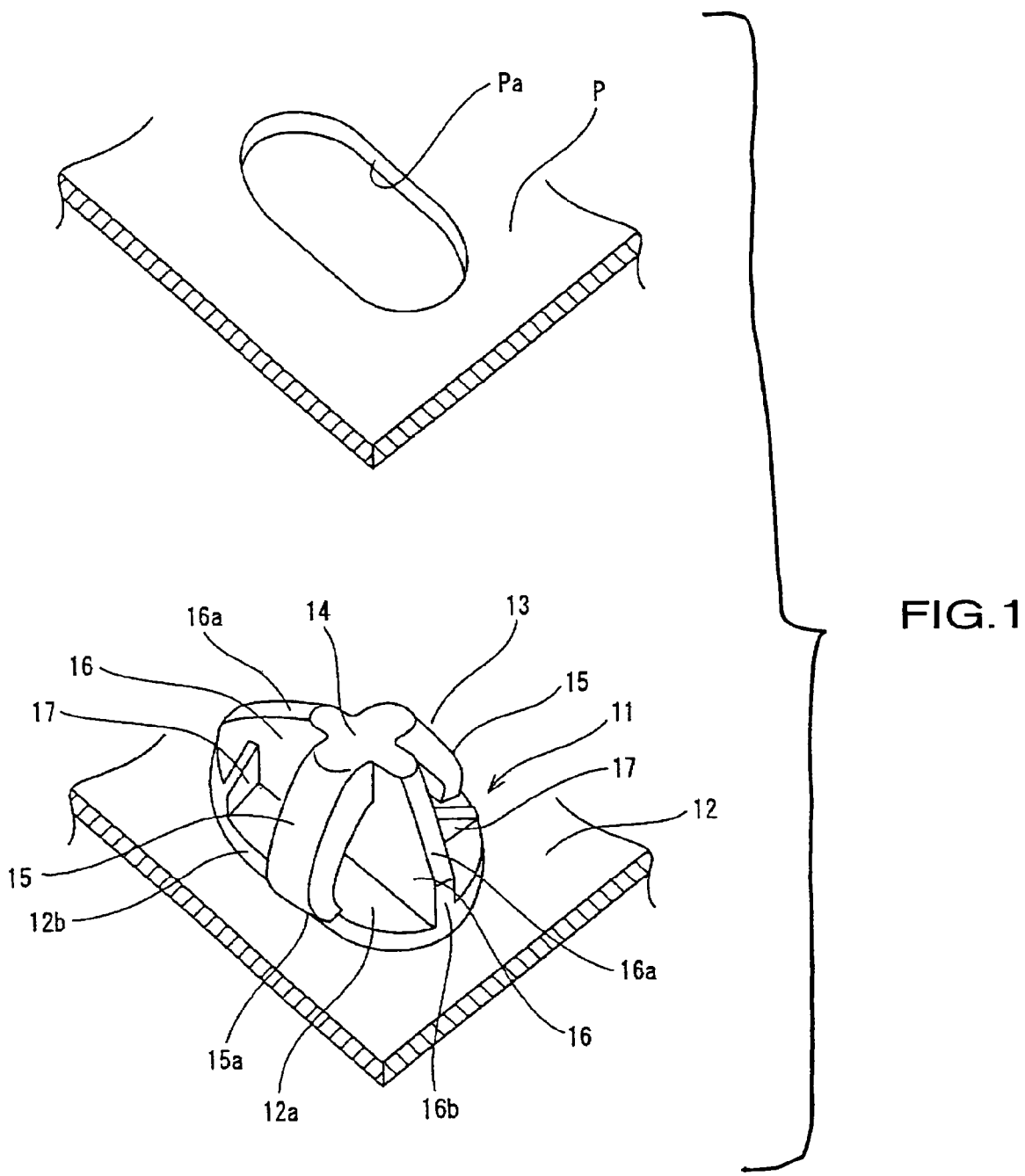
FIG. 1 is a perspective view depicting a clamp locking structure according to a first embodiment of the present invention.

Below, the first example of the present invention is explained with reference to the figures. As illustrated in FIGS. 1–3, clamp 11 may be constructed of any suitable material such as, for example, synthetic resin. The clamp includes base plate section 12 which may be formed integrally and in one piece with a component to be fixed to an automotive body panel. Alternatively, the base plate section 12 may be formed as a separate unit and attached to the component to be fixed. Locking section 13 projects vertically from the center of base plate section 12 in order to lock and fix clamp 11 to through hole Pa of automotive body panel P. The present example illustrates an embodiment in which through hole Pa has an elongated shape. Examples of components to be fixed to an automotive body panel include elements such as, for example, electrical connection boxes, wire harnesses, fuse boxes, relay boxes, and joint boxes, and other instruments which may fixed on an automotive body.

Figure 2A:
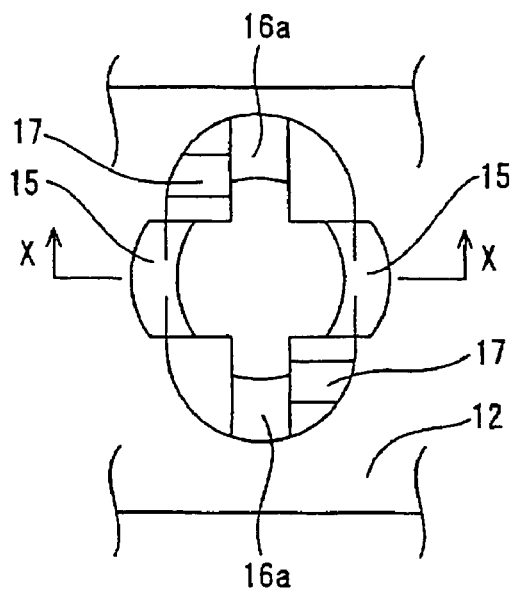
FIG. 2A is a top view of the clamp of the embodiment of FIG. 1.
Figure 2B:
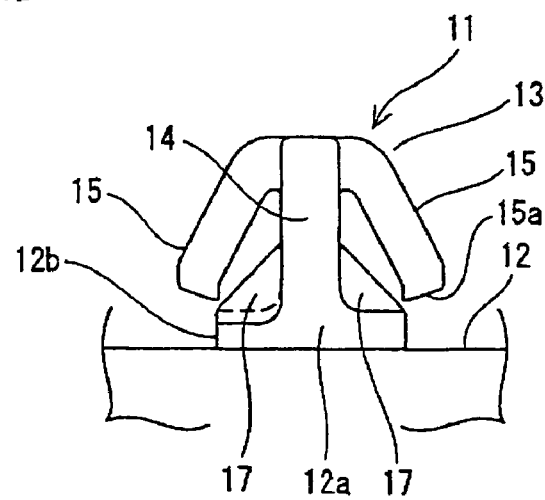
FIG. 2B is a front elevational view of the clamp of the embodiment of FIG. 1.
Figure 2C:
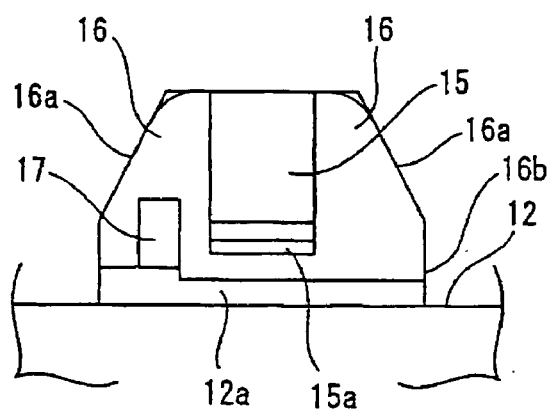
FIG. 2C is a side elevational view of the clamp of the embodiment of FIG. 1.
Figure 2D:
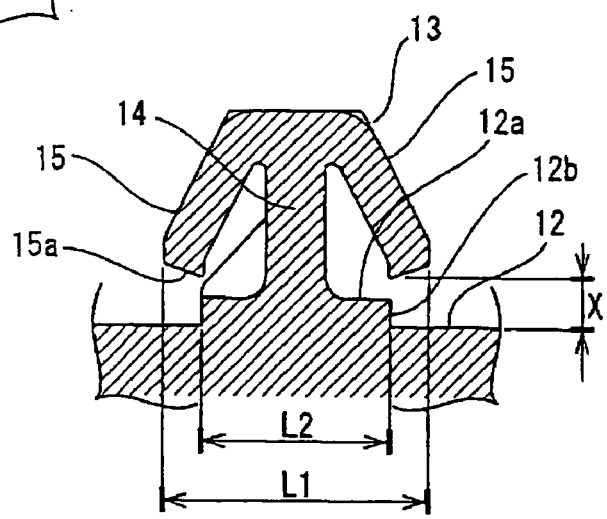
FIG. 2D is a cross sectional view of the clamp of the embodiment of FIG. 1, taken along line X—X in FIG. 2C.

On base plate section 12, base 12a with a matching elliptical outer peripheral shape corresponding to the shape of through hole Pa, projects from the base plate section 12 in the thickness direction. On the outer periphery of base 12a is coupling step section 12b which may come in contact with the entire periphery of the inner peripheral surface of through hole Pa. Locking section 13 includes support pin 14 projecting from the center of base 12a in the vertical direction. Support pin 14 may be formed integrally and in one piece with the base plate section 12. A pair of locking wings 15 extend from the tip of support pin 14, spreading away from the center of support pin 14 and back toward support pin 14 toward base plate section 12. The pair of locking wings 15 slope and open farther apart in opposing directions. Locking wings 15 are formed such that they remain in a state in which they can elastically bend and extend toward both sides of a narrow side of base 12a, while their tip sections 15a drape down almost vertically toward base plate section 12. As illustrated in FIG. 2D, length L1 between tip sections 15a of locking wings 15 is designed to be larger than length L2 across the narrow side of base 12a. Moreover, gap X is designed to be slightly larger than the thickness of automotive body panel P through which clamp 11 engages, so that a peripheral edge section of automotive body panel P can be sandwiched between tip sections 15a of locking wings 15 and base plate section 12.

Further, support pin 14 is equipped with a pair of guide pieces 16. Guide pieces 16 may be formed integrally and in one piece with support pin 14 and base 12a, and extend in a direction intersecting locking wings 15. Outer surface sections of guide pieces 16 form sloped guide surfaces 16a which slope so that points thereupon spread apart father from each other from the tip section of support 14 toward base 12a, while they join edge surfaces on the wider sides of coupling step sections 12b. Joining sections 16b of sloped guide surfaces 16, are formed as ends of sloped guide surfaces 16. The joining sections 16b are straight and may be almost vertical. When base 12a is to be engaged with through hole Pa, joining sections 16 align in a straight fashion and guide clamp 11 near the ends. Triangular reinforcement ribs 17 are provided at symmetrical positions on a side of each guide piece 16 and extend from base 12a in a projecting manner, so that bending of guide pieces 16 is restricted. When clamp 11 is constructed as above is formed by molding, a mold is divided into left and right sections along the center toward the directions of left and right locking wings 1 and stripped in the lateral directions. Thus, base 12a which engages with through hole Pa has an integral structure without gaps.

Steps to attach the component to be fixed to the body panel P using clamp 11 through the though hole Pa of automotive body panel P will now be explained, with reference to FIGS. 3A–3C. Base plate section 12 of clamp 11 may be formed integrally and in one piece with the component to be fixed to the body panel. Alternatively, base plate section 12 of clamp 11 may be a separate element attached to the component with an attachment member such as, for example, a belt formed integrally with clamp 11 and extending out of base plate section 12 or with tape to attach base plate section 12 to the component to be fixed to the body panel. The present example depicts an embodiment in which clamp 11 is integrally formed with the component to be fixed.

Figure 3A:
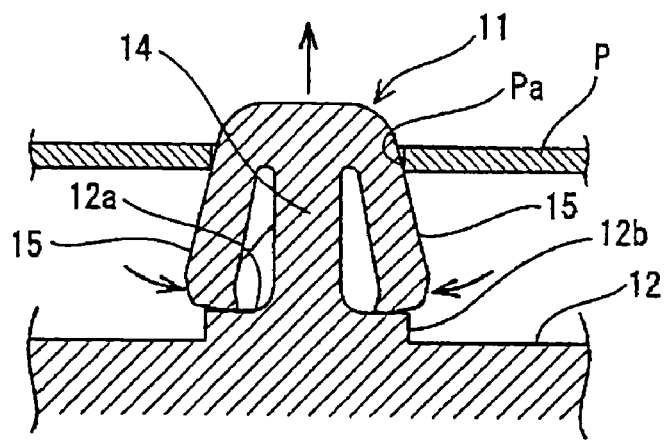
FIG. 3A and 3B are cross sectional views of the clamp of the embodiment of FIG. 1 illustrating the steps to mount a clamp through an automotive body panel.

First, as illustrated in FIG. 3A, the tip section of locking section 13 of clamp 11 is inserted through the through hole Pa of automotive body panel P. Then, locking wings 15 come in contact with the inner periphery of through hole Pa and are deformed to bend and partially close toward each other. Then, when locking section 13 is inserted farther into through hole Pa, sloped guide surfaces 16a of guide pieces 16 slide on the inner periphery of through hole Pa, and thereby locking section 13 is inserted as it is guided through the center of through hole Pa. Moreover, locking section 13 is guided so that both ends of guide pieces 16 face toward wider direction of elongated through hole Pa while locking wings 15 face toward narrower direction of the elongated through hole Pa.

Figure 3B:
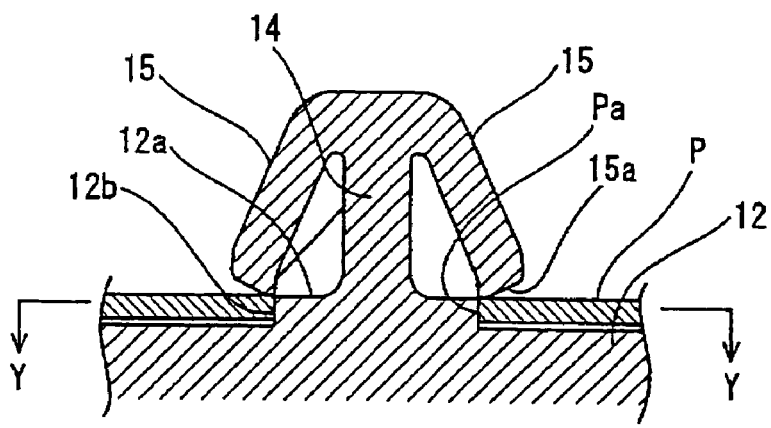
Figure 3C:
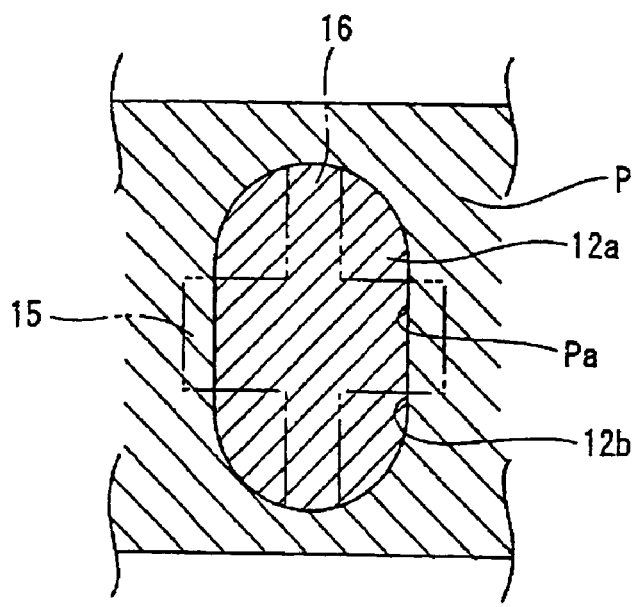
FIG. 3C is a cross sectional view of the clamp of the embodiment of FIG. 1, taken along line Y—Y in FIG. 2B.

Next, as illustrated in FIG. 3B, through hole Pa engages base 12a and coupling step section 12b comes in contact with the entire periphery of the inner peripheral surface of through hole Pa. Further, when locking section 13 passes through hole Pa, locking wings 15 recover to open and the tip sections of locking wings 15 spread apart wider than through hole Pa and face against the peripheral edge section of through hole Pa. In this manner, with clamp 11, coupling step section 12b of base 12a meet and engage with the entire periphery of the inner peripheral surface of elongated through hole Pa. Therefore, rotational movements of clamp 11 are securely restricted while the locking effects of locking wings 15 lock clamp 11 to automotive body panel P so that it will not come out. Moreover, base 12a completely seals through hole Pa and hence, through hole Pa is completely protected against water and dust.

Further, rather than having an elongated shape, through hole Pb of automotive body panel P may be of a quadrangle shape, such as a square or a rectangle.

Figure 4:
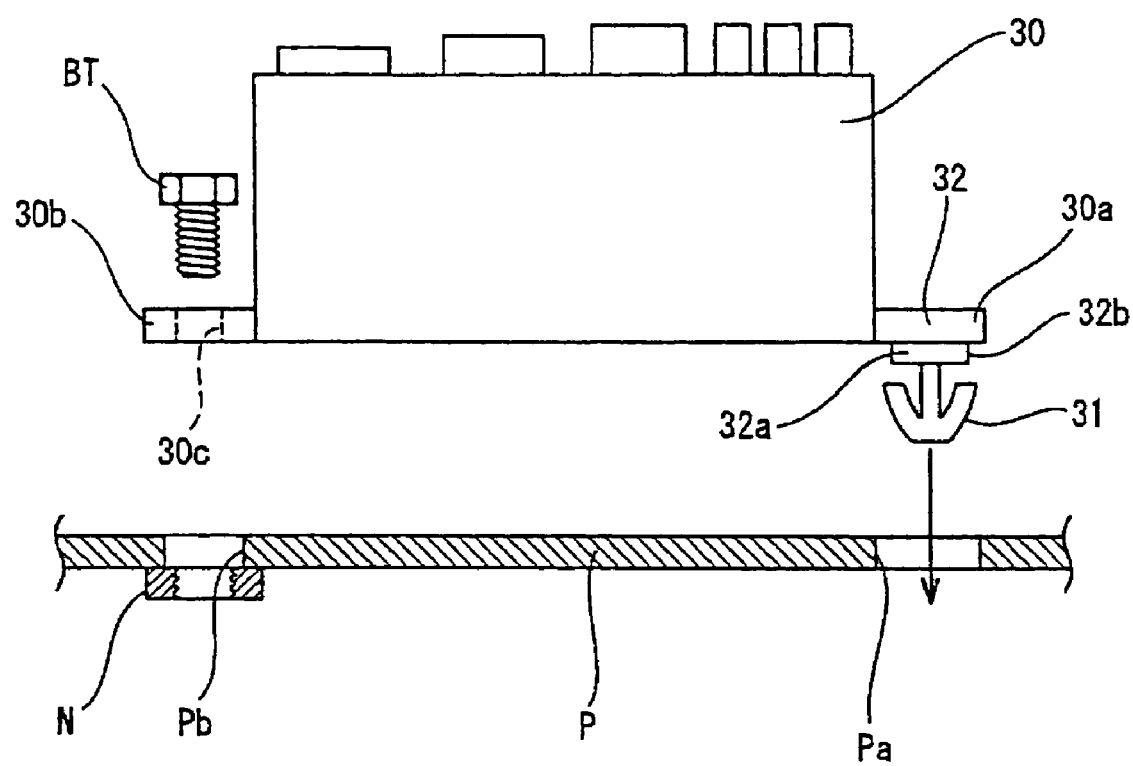
FIG. 4 is a side elevational view partially in cross section of a clamp according to a second embodiment of the present invention.
Figure 5A:
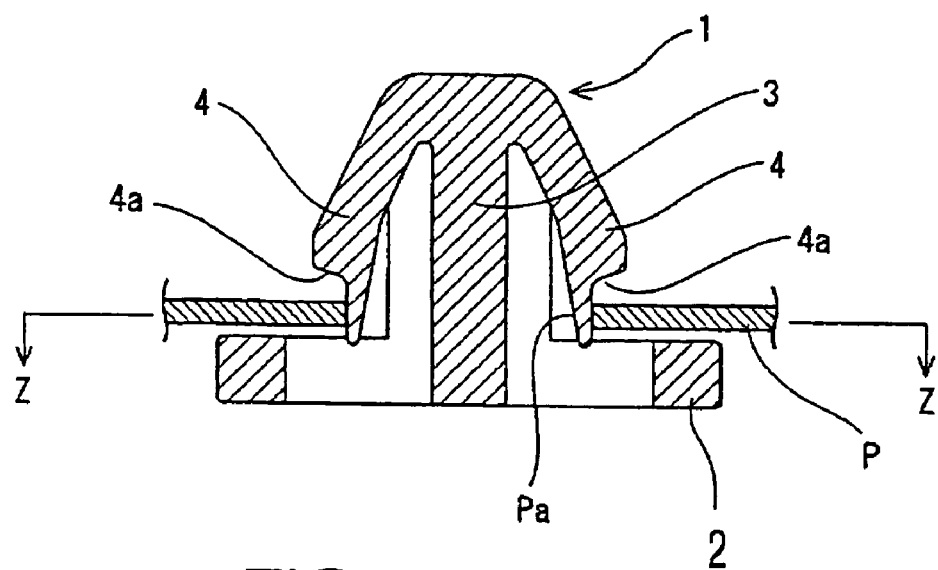
FIG. 5A is a cross sectional view illustrating how the clamp engages with an automotive body panel in a conventional clamp.
Figure 5B:
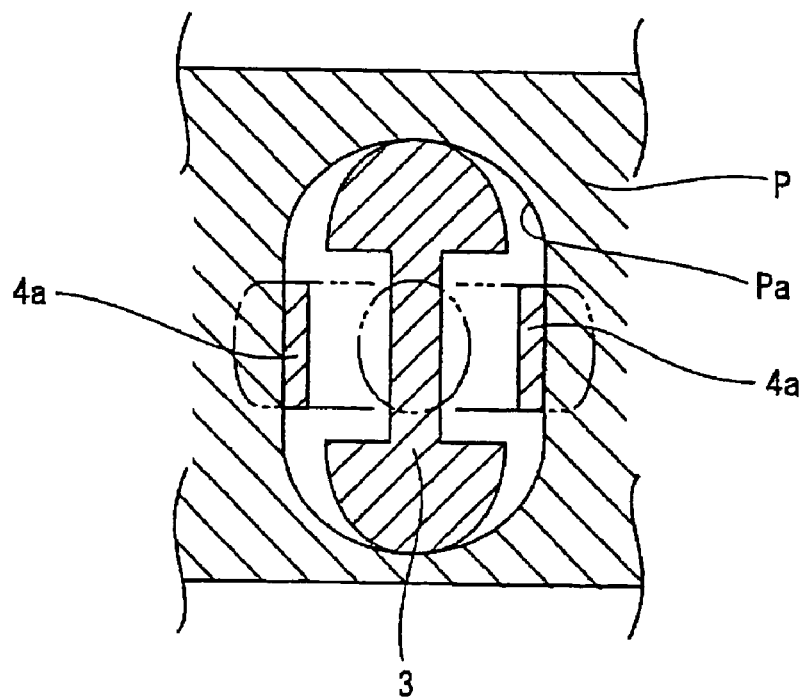
FIG. 5B is a cross sectional view along line Z—Z in FIG. 5A'

FIG. 4 depicts the second embodiment of a locking structure for a clamp. In this embodiment, the component to be fixed to an automotive body panel is an electrical connection box 30 such as, for example, a fuse box, a relay box, or a joint box. Clamp 31 may be integrally formed with base plate section 32, with mounting portion 30a projecting from one outer surface of electrical connection box 30. Mounting piece 30b which has bolt hole 30c for fastening with bolt BT is provided in a projecting manner on the other outer surface of electrical connection box 30. Through holes Pa and Pb are formed on automotive body panel P which is a counterpart member with the same distance therebetween as that between mounting pieces 30a and 30b. The shape of through hole Pa where clamp 31 is to be inserted is elongated in accordance with an elliptical shape of base 32a, and then nut N is fixed to through hole Pb where bolt BT is to be inserted. Moreover, the orientation of the elongated shapes of through hole Pa and base 32a are defined so that the position of bolt 30c for mounting piece 30b and that of through hole Pb match when base 32a of clamp 31 is engaged to through hole Pa with an elongated shape. Furthermore, the other aspects of the construction are the same as those in the first embodiment, and hence, the same numeral designators are employed and their explanations are omitted.

In the second embodiment with the above construction, in order to mount and fix electrical connection box 30 to automotive body panel P, first, clamp 31 provided on mounting piece 30a is inserted, locked and fixed in through hole Pa. At this point, as locking step section 32b of clamp 31 is in contact with the entire inner peripheral surface of through hole Pa with the elongated shape, movement of the electrical connection box 30 is restricted in rotational directions and in the direction of insertion. Therefore, in a case where the other mounting piece 30b is to be fixed with bolt B, the work operability of procedures to tighten bolt B can be improved because electrical connection box 30 does not rotate and is aligned with bolt hole 30c and through hole Pb aligned with each other.

Furthermore, the above embodiment depicts an example in which an electrical connection box is employed as a component to be fixed to an automotive body panel using a clamp. However, various items such as a wire harness, interior panel, or other electrical instruments can be employed as a component to be fixed to the body panel. Further, the counterpart member is not limited to an automotive body panel, but may be an electrical instrument such as, for example, an electrical connection box, a cover, or the like.

As is clear from the explanations herein above, the locking structure according to the present invention enables a locking step section formed on a base of a clamp to come in contact with a through hole of a counterpart member around the entire periphery. Therefore, the through hole can be completely sealed and protects the through hole against water and dust. Moreover, by making a through hole in an elongated shape as well as making a base in accordance with an elliptic shape, engaging the through hole with the base can restrict rotational movements of the clamp, thereby facilitating alignment of a component to be fixed. Further, when a clamp with a base in an elliptic shape is employed for fixing an electrical connection box, effects of a locking step section engaged with a through hole to stop rotations stabilizes temporary alignment of the electrical connection box. Therefore, work operability of procedures to tighten a bolt on the electrical connection box can be improved.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2003-201164, filed on Jul. 24, 2003, which is herein expressly incorporated by reference in its entirety.

What is claimed is:

1. A clamp having a locking structure for insertion through a through hole of a counterpart member to lock and fix a component to the counterpart member, said locking structure comprising:
    a support pin projecting from a base plate section of said clamp;
    a pair of locking wings extending from a tip section of said support pin so that a peripheral edge section of the through hole may be sandwiched between free ends of said locking wings and said base plate section;
    a coupling step section formed on a base of said base plate section to engage the through hole and contact the entire inner peripheral surface of the through hole;
    a pair of guide pieces provided on said support pin and extending in directions substantially transverse to said locking wings;
    sloped guide surfaces extending from the tip section of said support pin to said coupling step section on the outer surfaces of said guide pieces; and
    reinforcement ribs formed between said guide pieces and said base.

2. The clamp having a locking structure according to claim 1, wherein said coupling step section has an elongated shape which matches the inner peripheral surface of the through hole.

3. The clamp having a locking structure according to claim 1, further comprising:
    a component to be fixed to the counterpart member, wherein said clamp is formed integrally and in one piece with said component to be fixed to the counterpart member.

4. The clamp having a locking structure according to claim 1, further comprising:
    a component to be fixed to the counterpart member, wherein said clamp is attached to said component to be fixed to the counterpart member.

5. The clamp having a locking structure according to claim 1, further comprising:
    a component to be fixed to the counterpart member, wherein said clamp projects from said component to be fixed to the counterpart member.

6. The clamp having a locking structure according to claim 1, wherein each of said locking wings includes a tip section draping substantially vertically toward said base plate section.

7. The clamp having a locking structure according to claim 6, wherein the distance between said tip sections of said locking wings is greater than the distance across a side of said base.

8. The clamp having a locking structure according to claim 1, wherein said base has an elongated shape which matches the inner peripheral surface of the through hole.

9. The clamp having a locking structure according to claim 1, further comprising joining sections provided at ends of said sloped guide surfaces.

10. A clamp having a locking structure for insertion through a through hole of a counterpart member to lock and fix a component to the counterpart member, said locking structure comprising:
    a support pin projecting from a base plate section of said clamp;
    a pair of locking wings extending from a tip section of said support pin so that a peripheral edge section of the through hole may be sandwiched between free ends of said locking wings and said base plate section;
    a coupling step section formed on a base of said base plate section to engage the through hole and contact the entire inner peripheral surface of the through hole;
    a counterpart member; and
    a component to be fixed to said counterpart member, wherein said component to be fixed is an electrical connection box, and said counterpart member is an automotive body panel, and said clamp is formed integrally on an outer surface of said electrical connection box such that said electrical connection box can be fixed on said automotive body panel through said clamp.

* * * * *